United States Patent [19]

Reid

[11] Patent Number: 5,232,590
[45] Date of Patent: Aug. 3, 1993

[54] WATER FILTRATION APPARATUS

[76] Inventor: Roger P. Reid, 1907 Alder, Caldwell, Id. 83605

[21] Appl. No.: 925,097

[22] Filed: Aug. 6, 1992

[51] Int. Cl.$^5$ ............................................. B01D 63/00
[52] U.S. Cl. .................................. 210/257.2; 210/266; 210/282; 210/321.6; 210/257.1
[58] Field of Search ................... 210/257.1, 257.2, 281, 210/266, 282, 321.6

[56] References Cited

U.S. PATENT DOCUMENTS

| | | | |
|---|---|---|---|
| 582,403 | 5/1897 | Stifel | 210/257.1 |
| 602,883 | 4/1898 | Tyden | 210/257.1 |
| 4,066,551 | 1/1978 | Stern | 210/282 |
| 4,287,057 | 9/1981 | Stanley | 210/282 |
| 4,332,685 | 6/1982 | Nowlin et al. | 210/266 |
| 4,645,595 | 2/1987 | Kim et al. | 210/282 |
| 4,759,844 | 7/1988 | Lipschultz et al. | 210/266 |
| 4,997,553 | 3/1991 | Clack | 210/257.2 |
| 5,037,547 | 8/1991 | Burrows | 210/266 |
| 5,082,557 | 1/1992 | Grayson et al. | 210/257.1 |
| 5,122,265 | 6/1992 | Mora et al. | 210/257.2 |

Primary Examiner—Stanley S. Silverman
Assistant Examiner—Cynthia L. Nessler
Attorney, Agent, or Firm—Paul F. Horton

[57] ABSTRACT

Water filtration apparatus with an internal by-pass for conducting water from a water source to a storage tank and from the storage tank through filter media to a tap. The apparatus includes a filter housing with an inlet port, and outlet port, and a combination inlet-outlet port connected to the storage tank. Water from the source flows slowly into the filter housing through the inlet port and through the combination port to the tank. Once the tap is opened, water flows from the storage tank, through the filter media, out the outlet port and out of the tap.

4 Claims, 1 Drawing Sheet

WATER FILTRATION APPARATUS

BACKGROUND OF THE INVENTION

1. Field of the Invention

This invention relates, in general, to water filtering systems, and, more particularly, to filter housings provided with an internal by-pass.

2. Description of the Prior Art

Conventionally, water filtering systems utilize a filter housing with a single inlet port and a single outlet port with filter media disposed therebetween. For connection of the filter with a storage tank, an external tee member is used as a by-pass between water source and storage tank. One arm of the tee is connected to a water source, a second arm to the tank, and the single leg is connected to the inlet port of a filter housing.

SUMMARY OF THE INVENTION

The present invention provides a filter housing which eliminates the need for an external tee member. The present invention provides, in effect, an internal tee having an inlet port connected to a water source; a combination inlet-outlet port connected to a storage tank; and an outlet port connected to a tap. In eliminating the external tee member, the present invention reduces the number of external connections, within the system, by one, with resultant reduction of connecting and disconnecting time for both installation and maintenance; reduces the chances of leakage because of a reduction in number of connections; reduces space requirements; and provides for a neater appearing system.

Additional objects and advantages will become apparent and a more thorough and comprehensive understanding may be had from the following description taken in conjunction with the accompanying drawings forming a part of this specification.

DETAILED DESCRIPTION OF THE INVENTION

Figures 1, 2:
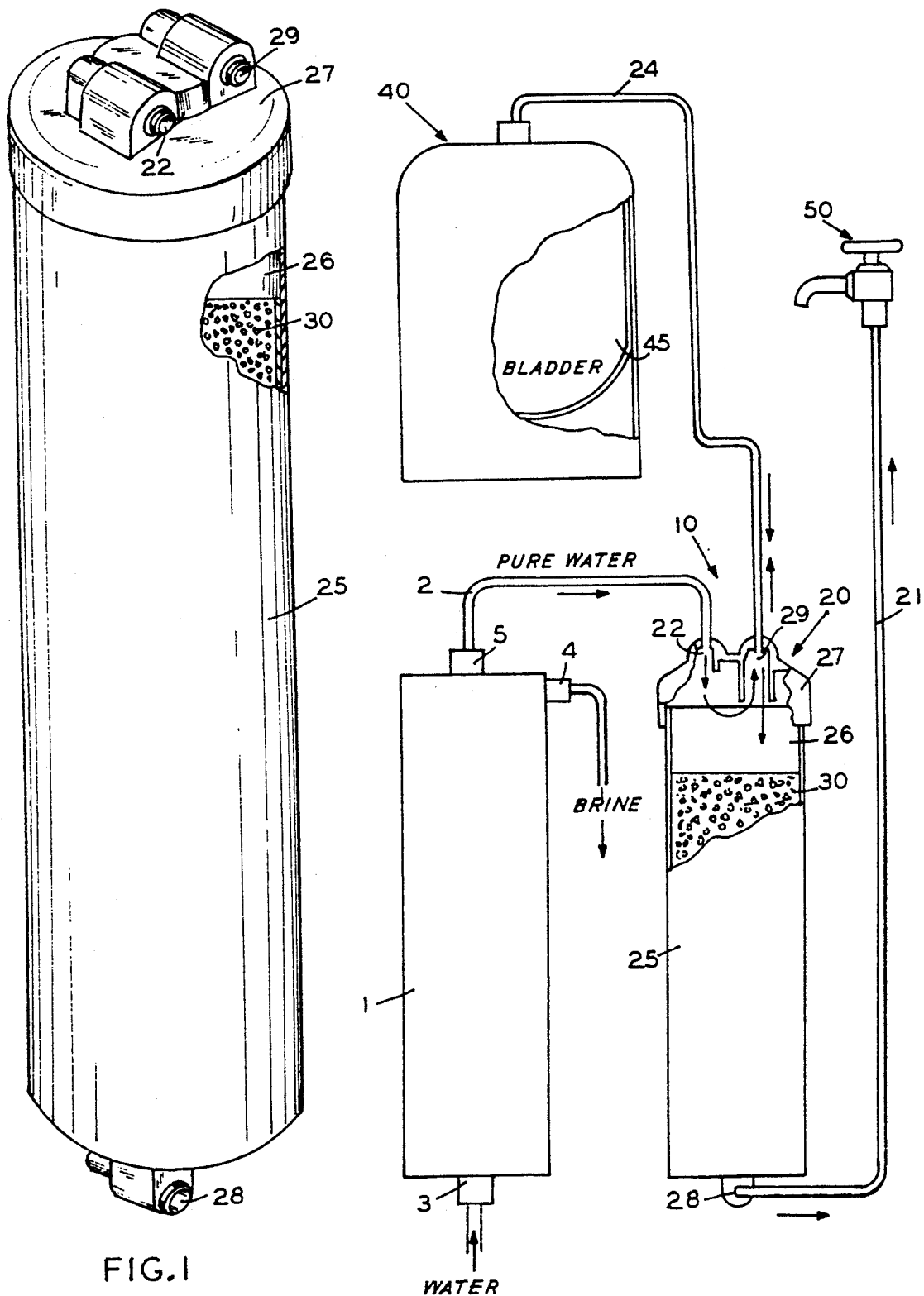
FIG. 1 is a perspective view of the filter housing of the invention, in partial section.
FIG. 2 is a schematic view, showing the water filtration apparatus connected to a reverse osmosis device, used as a water source.

Referring now to the drawings, an embodiment to be preferred of water filtration apparatus 10 made according to the present invention is disclosed. Apparatus 10 includes, generally, a water source, designated generally by the numeral 1, a water filter 20, a storage tank 40, and a tap 50.

While water source 1 may be any conventional water source, it is contemplated that a reverse osmosis water source will most likely be used with filter 20 of the present invention. Reverse osmosis units are old in the art of water purification, as shown and as typified by the purifier of J. D. Kirshmann, U.S. Pat. No. 4,218,317. Such purifiers produce purified water at a very slow and at what may be called a drip rate. Such purifiers are generally provided with a water inlet 3, a brine outlet 4, and a purified water outlet 5.

Water from source 1 is passed through a conduit 2 to water inlet port 22 of water filter 20. Water filter 20 includes a water-tight housing constructed of any suitable material, defining an internal cavity 26 operable to hold filter media 30, preferably of cartridge construction for ready removal and replacement through a threaded cap structure 27, shown in FIG. 1. Housing 25 defines, besides inlet port 22, a water outlet port 28 and a combination water inlet-outlet port 29. Each of the ports may be provided with quick connect fittings, as is preferred, or conventional threaded fittings. While the fittings are shown located at an angle of ninety degrees relative to the longitudinal axis of housing 25, such angular disposition is arbitrary.

Combination port 29 is in unobstructed fluid communication with storage tank 40 by means of conduit 24 to allow water flowing from source 1, through inlet port 22, to flow freely and unimpeded to tank 40 and to also flow freely from tank 40 back into the housing through the combination port 29, depending upon the pressure differential within the housing and tank. Tank 40 may be provided with an air bladder 45, air pocket, pump, or other displacement means for forcing water back into the filter housing.

Located between inlet port 22 and outlet port 28 and also between combination port 29 and the outlet port so as to require water flow therethrough is filter media 30. The media may include activated carbon or alumina; ion exchange resins; granular calcium carbonate; polyphosphate crystals; or any other media serving to take material from the water; add material to the water; change the pH of the water; or other well-known functions. While encapsulating a granular media within internal cavity 26 is preferred, the media may also be in the form of molded briquettes, and the like.

Treated water, having passed through media 30, flows through outlet port 28. Preferably connected to port 28 by conduit 21 is a conventional water tap or faucet 50 for controlling flow of water coming from the filter and for provided a easily accessible outlet from the filter.

In operation, and assuming the water tap 50 is turned to an off position to prevent flow and assuming that the pressure within storage tank 40 is less than the pressure of water at source 1, water flows from source 1 through the conduit, inlet port 22 of housing 25, through top portion of cavity 26, through combination port 29 and conduit 24 into storage tank 40. Obviously, once the pressure between tank 40 and source 1 is equalized, water will discontinue flowing. When tap 50 is opened, water flows out of the tank, through conduit 24, through combination port 29, through filter media 30 where the water is treated, through port 28, conduit 21 and hence out of the tap 50.

Very small amounts of water may also flow directly from source 1 through the filter media and out the tap, once the tap is opened. It will be noted, then, that with inlet port 22 and combination port 29 in cooperation with internal cavity 26 of filter housing 25, an internal tee is effectively formed to obviate the need for an external tee.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the mean- ing and range of equivalency of the claims are therefore to be embraced therein.

I claim:

1. Water filtration apparatus comprising:
   a water source;
   a water filter including a water-tight housing defining an internal cavity; a water inlet port mounted and extending directly through a first wall of said housing for receiving water from said water source; a water outlet port mounted and extending directly through a second wall of said housing for passage of filtered water; and a combination water inlet-outlet port mounted and extending directly through said first wall of said housing for unobstructed transference of water between a storage tank and said cavity; said filter further including filter media positioned between said inlet port and said outlet port and between said combination port and said outlet port; and
   a storage tank means connected to said combination port for receiving water from said water source through said cavity via said combination port and for discharging stored water via said combination port through said filter media and through said outlet port.

2. The apparatus as described in claim 1 further comprising a water tap connected to said outlet port of said housing for controlling water flow through said filter media and from said outlet port.

3. The apparatus as described in claim 1 wherein said water source comprises a reverse osmosis water purification device.

4. Water filtration apparatus comprising:
   a water source including reverse osmosis water purification means;
   a water filter including a water-tight housing defining an internal cavity; a water inlet port mounted and extending directly through a first wall of said housing for receiving water from said water source; a water outlet port mounted and extending directly through a second wall of said housing for passage of filtered water; and a combination water inlet-outlet port mounted and extending directly through said first wall of said housing for unobstructed transference of water between a storage tank and said cavity; said filter further including filter media positioned between said inlet port and said outlet port and between said combination port and said outlet port; and
   a storage tank means connected to said combination port for receiving water from said water source through said cavity via said combination port and for discharging stored water via said combination port through said filter media and through said outlet port; and,
   a water tap connected to said outlet port of said water filter housing for controlling water flow through said filter media and from said outlet port.

* * * * *